(12) United States Patent
Danziger

(10) Patent No.: US 12,170,377 B2
(45) Date of Patent: Dec. 17, 2024

(54) FOIL-LIKE FUNCTIONAL MATERIAL AND METHOD FOR THE PRODUCTION THEROF

(71) Applicant: ELFOLION GMBH, Quedlinburg (DE)

(72) Inventor: Manfred Danziger, Quedlinburg (DE)

(73) Assignee: ELFOLION GMBH, Quedlinburg (DE)

( * ) Notice: Subject to any disclaimer, the term of this patent is extended or adjusted under 35 U.S.C. 154(b) by 674 days.

(21) Appl. No.: 16/959,486

(22) PCT Filed: Jan. 11, 2019

(86) PCT No.: PCT/DE2019/000004
§ 371 (c)(1),
(2) Date: Jul. 1, 2020

(87) PCT Pub. No.: WO2019/141303
PCT Pub. Date: Jul. 25, 2019

(65) Prior Publication Data
US 2021/0075021 A1 Mar. 11, 2021

(30) Foreign Application Priority Data
Jan. 16, 2018 (DE) .......................... 102018000272.2

(51) Int. Cl.
*H01M 4/04* (2006.01)
*H01M 4/66* (2006.01)
*H01M 4/74* (2006.01)

(52) U.S. Cl.
CPC .......... *H01M 4/663* (2013.01); *H01M 4/0404* (2013.01); *H01M 4/0423* (2013.01); *H01M 4/667* (2013.01); *H01M 4/747* (2013.01)

(58) Field of Classification Search
None
See application file for complete search history.

(56) References Cited

U.S. PATENT DOCUMENTS

2003/0102225 A1 6/2003 Kim
2004/0185326 A1 9/2004 Wetzel
(Continued)

FOREIGN PATENT DOCUMENTS

DE 10196402 T1 6/2003
DE 102010011413 A 9/2011
(Continued)

OTHER PUBLICATIONS

International Search Report of PCT/DE 2019/000004, mailed Apr. 4, 2019.

*Primary Examiner* — Tracy M Dove
(74) *Attorney, Agent, or Firm* — Carter, DeLuca & Farrell LLP; Peter DeLuca

(57) ABSTRACT

A foil-like functional material (1) providing a predefined function and may be used for targeted physical, chemical, physicochemical, biological, technical and technological purposes, and in which is arranged a support medium (2), which comprises a total support volume, has a cross-sectional extent (7) of ≤100 μm, like a matrix, and is formed from linear support elements (3a) and node-like support elements (3b), which form the substance components of the support medium (2) and pass through the total support volume to form a strip-like extent with interconnected partial volumes (5), situated therein and spanned by support elements (3) close by. The support elements (3) are sheathed with a first functional substance (4) which provides a first function. The remaining volume of the total support volume is filled with one second functional substance (6) which differs from the first function.

18 Claims, 3 Drawing Sheets

(56) References Cited

U.S. PATENT DOCUMENTS

2009/0311587 A1 12/2009 Best
2013/0059211 A1 3/2013 Schaefer et al.
2014/0054020 A1 2/2014 Kroener

FOREIGN PATENT DOCUMENTS

| DE | 102012000508 A1 | 7/2013 |
| DE | 102013108808 B4 | 1/2016 |
| EP | 1455404 A2 | 9/2004 |
| JP | H1032126 A | 2/1998 |
| WO | 02058172 A2 | 7/2002 |

025# FOIL-LIKE FUNCTIONAL MATERIAL AND METHOD FOR THE PRODUCTION THEROF

This is an application filed under 35 USC § 371 of PCT/DE2019/000004 filed on Jan. 11, 2019, claiming priority to DE 10 2018 000 272.2 filed on Jan. 16, 2018, each of which is herein incorporated by reference in its entirety.

BACKGROUND OF THE INVENTION

(1) Field of the Invention

The invention relates to a foil-like functional material which provides at least one predetermined function and can thus be used for targeted physical, chemical, physicochemical, biological or other technical or technological purposes.

A foil-like functional material in the sense of the invention is always a composite material, i.e. a material composed of three or more joined materials, wherein at least one of these materials is a construction material and at least two of the materials are functional materials. The functional materials serve in particular to fulfill that function which is decisive and characteristic for the specific, targeted physical, chemical, physicochemical, biological or other technical or technological application. In its entirety, a foil-like functional material has properties different from those of the materials from which it is made. It can therefore be used to implement a targeted function, and more particularly in a different way than its individual materials could be used.

Functional materials are a sub-group of materials in terms of materials science. With these materials, a distinction is usually made between structural materials and functional materials wherein functional materials in contrast to structural materials are not primarily characterized by their mechanical strength and the resulting mechanical stability, but are characterized by specific electrical, mechanical, magnetic, acoustic, optical, or biological-chemical properties that can be influenced in a targeted manner in order to change the properties of a component. With functional materials, the properties, usage and intended application of the functional material are foremost, rather than the structural design of components; however, functional materials can also have mechanical strength.

The invention relates in particular to a foil-like functional material for use as an electrode for application in electrical energy stores and to a method for producing this foil-like functional material. Aside from this, on the basis of the present invention, functional materials can also be realized which can be used for functions other than electrodes in electrical energy stores.

The term foil-like material is used to describe the invention. Foil-like materials usually have many properties in common with foils. In addition, they also show some significant differences compared to foils.

(2) Description of Related Art

As is common knowledge, foils are thin materials in sheet form or in web form, often made of plastic or metal, but also made of other materials, with very small thickness and a large area. Typical foil thicknesses are less than 0.4 millimeters. Foils are usually manufactured as continuous webs, rolled up and later often cut into pieces suitable for the respective application. Although foils are characterized by large areas, they represent a three-dimensional solid, wherein when x and y characterize the area dimension and z the thickness of the foil, it holds that $\Delta x$ and $\Delta y \gg \Delta z$, wherein $\Delta x$ represents the length, $\Delta y$ represents the width and $\Delta z$ represents the thickness of the foil. Another characteristic feature is that the material component, i.e. the material from which the foil is made, fills the entire three-dimensional solid body macroscopically without exception, i.e. there are no other materials or macroscopically free spaces anywhere within the solid body. Only the material from which the foil is made fills the three-dimensional space encompassed by the foil. All other materials that look like a foil, behave like foils and can be used like foils, but do not combine the listed features, are foil-like materials. Unfortunately, these materials are also called foils, which, however, is not strictly correct.

Foil-like materials are much like foils thin materials in sheet or web shape with a large extent in two dimensions and a comparatively small extent in a third dimension. Foil-like materials are usually also manufactured in continuous webs, rolled up and later often cut into suitable pieces. The difference to foils is that the body of a foil-like material, which is also characterized by x, y and z, where x and y represent the area dimension of the body and z the direction of the cross-sectional dimension of the foil-like material, with the cross-sectional dimension representing the measurable distance from one side of the body to the opposite side of the body, and $\Delta x$ indicating the length, $\Delta y$ indicating the width and $\Delta z$ indicating the cross-sectional extent of the foil-like material, is in this dimension contiguously penetrated by a material, which however does not fill the entire space, i.e. the material, of which the foil-like material is composed, does not macroscopically completely fill the three-dimensional space spanned by this body. Accordingly, this body is traversed by discrete or interconnected partial volumes, also called free volumes. Discrete partial volumes, also referred to as closed partial volumes, are cavities or hollow volumes or empty spaces that represent a free space within certain boundaries. These boundaries are formed by the material of which the foil-like material is composed, the delimiting layer or structure.

A foil-like functional material is a composition of interconnected materials. In a foil-like functional material, the partial volumes surrounded or delimited by a material, for example a construction material designed as a support medium, are penetrated by one or more other materials or even completely filled with one or more materials other than the material that limits the partial volume, for example the support medium.

For this reason, the spectrum of foil-like functional materials is correspondingly large.

Expanded polytetrafluoroethylene, also known as ePTFE, a specially processed form of polytetrafluoroethylene, should be mentioned here as an example of a construction material designed as a support medium. It can be formed as a foil-like material. During the manufacturing process, the material is referred to as multidirectional ePTFE. The material created by this manufacturing process is interspersed with PTFE molecular fibers and is characterized by a porous structure that has up to 70 percent open, fillable partial volumes.

Materials in the form of foil-like textile structures, such as woven fabrics, knitted fabrics, braids, nonwoven fabrics and felts, can also operate as support media for foil-like materials. The main components of all textile products are textile fibers, i.e. fibers that can be processed in textile manufacturing processes, in particular fibers that can be spun. These are linear structures, meaning that the ratio of length to diameter is significantly greater than 1, with a sufficient length and bendability and pliability as a prerequisite for their processability. The shape of the fibers can be divided into staple fibers, i.e. fibers of limited length, and filaments, i.e. continuous fibers.

A special form of textile structures are those that are made up of metal wires. A textile fabric made of metal wire is also called metal mesh or wire mesh. Metal fabrics are also made on weaving machines.

Electrode foils are used use in electrical energy stores as positive or negative electrodes or as anode foils or as cathode foils, which fulfill active and non-active functions. In the case of electrode foils, the charge carrier storage represents the overall active function. In contrast, non-active functions are the electrical conduction function for charging and discharging charge carriers, the connection function for the functional material performing the active function. In the case of the known electrode foils, the functional material often also supports the mechanical stability of the electrode foil or contributes significantly to the mechanical stability of the electrode foil.

Electrical energy stores are based for example on the spontaneous conversion of chemical to electrical energy and are therefore so-called galvanic cells, or they are based on storing electric energy in chemical compounds, wherein for example in Redox-Flow-batteries the reactants are present dissolved in a solvent. Alternatively, electrical energy stores can be based on the principle that the energy is stored statically in an electrical field. This principle is used in particular with capacitors, for example with electrolytic capacitors, supercapacitors, such as double-layer capacitors, pseudo-capacitors or hybrid capacitors. The thickness of the electrode foil should be as small as possible in order to achieve the highest possible capacity of the energy store with a small construction volume. To ensure the mechanical stability of the electrode foils, construction materials in the form of support foils or three-dimensional textile structures are used.

Metals in the form of metal foils are often used as material in electrode foils. In most cases, metal foils do not require an additional metal coating or an additional metallic coating, because the metal foil itself can, in addition to the mechanical stability, also guarantee the electrical conduction function for charging and discharging the charge carriers. In this context, the term stability encompasses the strength of the material against mechanical and thermal influences on the material, such as mechanical and thermal stress, bending, elongation, torsion, buckling, shape changes, etc.

The extent of these metal foils in the z-direction, i.e. the metal foil thickness, is defined by the condition that the required mechanical stability can be met and the metal foil can be safely further processed. Such metal foils cannot be made as thin as desired because the required mechanical stability must be ensured. However, considerably thinner metal foils would be sufficient to ensure the electrical conduction function.

The mechanical stability of the foil must first enable the manufacturing process of the electrode foils. The electrode foil must also ensure the functionality of the entire foil component of the assembly. To this end, composites with sufficient adhesion in conjunction with the layers and the components to be applied are necessary.

Electrode foils with a dielectric material designed as a foil are also known, for example a polymer foil with metallization applied to one or both sides. The metallization must be designed and dimensioned so as to ensure charging and discharging of the carriers. This includes a sufficiently high electrical conductivity that also withstands spontaneously occurring current densities. Since the thickness of these metal layers is usually greater than one or two micrometers and the metal coating is applied chemically, electrochemically or vacuum-technically, the manufacture of this composite is correspondingly expensive compared to the manufacture of pure metal foils. Metallization on both sides also has the disadvantage that a dielectric is located between two mutually independent metal layers. Additional process steps are required to connect these metal layers to one another, i.e. to short-circuit them.

For example, the thinnest possible electrically conductive aluminum foils are used to manufacture electrolytic capacitors. Due to their insufficient mechanical stability, electrically conductive foils made of high-purity aluminum with a foil thickness below 100 µm are difficult to process in conventional, i.e. state-of-the-art, manufacturing processes, for example for the manufacture of anode foils for electrolytic capacitors.

In lithium-ion-batteries, the thickness is conventional aluminum foil for the positive current collector which must also ensure the mechanical stability of the electrode, is between 25 µm and 15 µm. The goal here is to use foils with a foil thickness of approximately 10 µm. The thickness of conventional foils of these batteries for the negative current conductor made of copper, which must also ensure the mechanical stability of the electrode, is between 15 µm and 10 µm. The goal is to use foils with a foil thickness of approximately 6 µm. A major problem in this case represents the inadequate mechanical stability of the foils, especially during the manufacturing process of the electrode foils. For this reason, there are limits to reducing the thickness of the foils.

DE 10 2010 011 413 A1 discloses a cathodic electrode with a carrier that comprises a metallic material, in particular aluminum, and has a thickness of 15 to 45 µm. EP 1 455 404 A2 describes an electrode unit with a porous support structure constructed from metal wire.

To improve the mechanical stability of a metal foil, DE 10 2012 000 508 A1 discloses a method for manufacturing a so-called GLARE component wherein alternate webs of aluminum and prepreg-webs are superimposed and then glued or pressed together. The sequential order is such that aluminum sheets are always arranged on the outside. Prepreg-webs refer to webs made of pre-cured glass fiber-reinforced epoxy. However, mechanically stabilized metal foils produced by this method are not suitable for applications which require a foil with high electrical conductivity.

Fabrics coated with metal are also used in garments. Most importantly, the breathability of the fabric is maintained. DE 101 96 402 T1 describes a fabric clad with gold and a method for its manufacture. Breathability is ensured by virtue of the openings between the support elements coated with metal.

DE 10 2013 108 808 B4 discloses a method for producing a carbon-metal-composite and a method of manufacturing an arrangement of semiconductor elements. A carbon fiber fabric, which has band-shaped support elements, is coated with a metal, so that it can subsequently be used for dissipating heat on semiconductor components. For attachment to the semiconductor components, a solder metal is introduced into the interstices of the metal-coated carbon fiber fabric, which connects the coated carbon fiber fabric materially to the semiconductor component. The first metal layer applied to the carbon fiber fabric thus primarily serves to dissipate heat from the component, and the solder metal subsequently introduced mainly fulfills the function of constructive attachment on the component to be cooled. The band-shaped support elements fill a large part of the total volume to ensure effective heat dissipation. The solder metal, on the other hand, takes up only a small proportion of the total volume, which is sufficient for fastening the heat sink to the semiconductor component. As a result, the volume of the carbon fiber fabric takes up a large part of the total volume of the heat sink.

BRIEF SUMMARY OF THE INVENTION

It is the object of the invention to provide a foil-like functional material which has a support medium formed from a construction material in the sense of a supporting base body and at least two functional materials connected to the support medium. In this case, the support medium formed from the construction material should only have a small volume in relation to the volume of the entire foil-like functional material, with mechanical stability sufficient for the use of the foil-like functional material.

The object is achieved by a physical object and a method with the features according to the independent claims. Further embodiments are specified in the dependent claims.

The object is achieved in particular by a foil-like functional material which fulfills at least one predetermined function and can be used in this way for physical, chemical, physicochemical, biological or other technical and technological applications. Arranged in the foil-like functional material is a foil-like support medium made of at least one construction material and having a total support volume with a cross-sectional dimension<100 µm, which is to be regarded as a matrix, i.e. a basic body in which additional materials are embedded. The support medium is formed from linear and node-shaped support elements, hereinafter referred to briefly as linear and node-shaped support elements, which form the material components of the support medium and penetrate the total support volume, to form a band-shaped extent with interconnected neighboring partial volumes of the total support volume which are spanned by neighboring support elements. The linear and node-shaped support elements are sheathed with a first functional material, which fulfills a first function, and the remaining volume of the total support volume formed by the interconnected partial volumes is filled with at least one second functional material, which fulfills a second function that differs from the first function.

If the remaining volume of the total support volume formed by the interconnected partial volumes is filled with more than one second functional material, every second functional material fulfills at least one function that differs from the first function.

It is part of the invention that further functions can be performed by the second or further functional materials introduced into the partial volumes. Furthermore, it should also always be understood that the second or a further functional material introduced into the partial volumes does not necessarily fulfill only one function, but rather can fulfill several functions. At least one active or non-active function of a functional material introduced into the partial volumes differs from an active or non-active function of the first functional material sheathing the support elements.

The support medium is composed of a plurality of individual support elements which can be linear, i.e. large in one dimension and small in the other two dimensions, but can also be node-shaped. In the context of the invention, linear support elements are support elements which have approximately the same extent in those two dimensions where the linear support element is small. The ratio of the large dimension to the two smaller dimensions is at least 50:1. The ratio of the dimensions of the two smaller dimensions to one another is not less than 1:5 and not greater than 5:1. Line-shaped support elements thus differ from band-shaped support elements. In the event of large distances between the linear support elements at least in sections, the illustrated limits of the linear support elements can also be exceeded.

The line-shaped support elements have large mutual distances at least in sections, so that their two-dimensional effect with respect to the geometric plane in which the surfaces of the line-shaped support elements are located is negligible, and the line-shaped support elements therefore are not almost completely delimiting the spanned partial volumes from one another.

Large distances are understood to mean that the distance between the individual linear support elements in relation to the larger of the two smaller dimensions of the linear support elements is greater than 5:1. In this case, the ratio of the two smaller dimensions can exceed the previously noted restrictions.

In the context of the invention, a support element is node-shaped if it has a similar extent in all dimensions; in particular, the extent in all dimensions is small compared to the large dimension of the linear support elements. When two or more linear support elements touch each other, the support medium has node-shaped support elements at the points of contact.

In the context of the invention, the total support volume describes a volume which includes all support elements and thus the entire support medium.

In the context of the invention, a body has a band-shaped extent if its extent in one dimension is small in comparison to the extent in the other two dimensions.

The support elements are sheathed with a first functional material. At the points of contact of the support elements, the sheath can have defects, but under the proviso that all areas of the coating are interconnected and form a contiguous layer.

The support elements, which penetrate the total support volume, are arranged spaced apart from one another in sections so that partial volumes are spanned between adjacent support elements. The spanned partial volumes are designed as open, interconnected free spaces. These partial volumes are not currently filled with support elements and thus form an interstitial space between the support elements sheathed with a first functional material, which can be filled. According to the invention, these partial volumes, i.e. these interstitial spaces, are filled with at least one second functional material.

Furthermore, the first functional material should always be understood to mean the functional material with which the linear and node-shaped support elements are sheathed, and the second functional material is to be understood to mean the functional material that is introduced into the open, interconnected, free partial volumes spanned by the support elements, i.e. fills these free partial volumes. The second functional material fills the open, interconnected free partial volumes spanned by the support elements completely, but not in a compact form, which means that there are smaller free volumes within the second functional material, for example in form of pores, which can be open and interconnected, as well as contain other second functional materials.

According to the concept of the invention, the support elements are sheathed with a first functional material, which fulfills at least one first active or non-active function. The matrix shape of the coated foil-like support medium is retained. This means that most of the existing cavity, i.e. the free, interconnected partial volumes in the support medium, is retained, but is reduced by the volume of the first functional material enveloping the support elements. In particular, the total volume of the free partial volumes within the support medium is not less than the total volume of the support elements sheathed with the first functional material. Preferably, the ratio of the total volume of the free partial volumes to the total volume of the support elements sheathed with the first functional material is at least 2:1 or at least 5:1, particularly preferred at least 10:1.

In an advantageous embodiment, in a parallel arrangement of the linear support elements, the ratio of the extent of the linear support elements in the dimensions of the smaller extent to the distance of the linear support elements in the support medium is at least 1:1. The ratio is preferably at least 1:2 or at least 1:3 or at least 1:5.

One or more second functional materials, which perform active functions but also non-active functions, can advantageously be introduced into the existing partial volumes of the foil-like functional material, and the top and bottom sides of the foil-like functional material can be coated with a second functional material. At least one second functional material fulfills at least one active or non-active function which differs from an active or non-active function fulfilled by the first functional material.

In particular, open, pore-shaped interconnected cavities exist within the second functional material or within the second functional materials when the foil-like functional material is used as an electrode for electrical energy storage.

A foil-like functional material is therefore a composite material whose components or materials perform one or more other functions in addition to the actual characteristic function specific for the application of the functional material, so as to enable the intended application, for example, to store electrical energy or to aid catalysis-processes or to serve as a heating medium.

For this reason, it is usually necessary for the functional materials to perform both active and non-active functions.

Active function is understood to mean that a functional material fulfills the function that corresponds to the purpose for the use of the foil-like functional material, i.e. the function that is characteristic for the use of the foil-like functional material.

Non-active function is understood to mean that a functional material fulfills the function that is necessary to enable the functions that are active for the purpose for the use of the foil-like functional material. For this reason, both active and inactive functions are immensely important. A functional material can fulfill one or more functions, which can be active or inactive functions.

In this context, the support medium or the construction material forming the support medium also fulfills a non-active function, namely the mechanical stability of the foil-like functional material.

It can be advantageous for the use of the foil-like functional material, that at least one second functional material adherently covers the top and/or the bottom sides of the foil-like functional material.

In an advantageous embodiment of the foil-like functional material, the line-shaped support elements of the support medium form a fabric whose mutually perpendicular warp threads and weft threads are intertwined. In a preferred variant, the warp threads and weft threads are composed of a plurality of filaments. Alternatively, the warp threads and weft threads can be configured as monofilaments.

In an embodiment of the foil-like functional material, the first functional material, i.e. the functional material with which the support elements are sheathed, is a metal.

In a preferred embodiment of the foil-like functional material, the support medium is a fiberglass fabric or a carbon fiber fabric tape or a mineral wool fiber fabric tape or a polymer-fiber fabric tape or a wire fabric tape.

In a preferred embodiment of the foil-like functional material, the second functional material contains one of the substance mixtures from the group lithium/nickel oxide, lithium/manganese oxide, lithium/cobalt oxide and lithium/iron phosphate and optionally further additives, preferably carbon black.

The object is also achieved by a method for producing a foil-like functional material. This method includes the following steps:

sheathing support elements of a support medium by applying on the support elements a first functional material, which fulfills a first function, and filling the remaining volume of the total support volume formed by the interconnected partial volumes with at least one second functional material, which fulfills a second function that differs from the first function.

The support elements can be sheathed by metallizing the support elements.

The support elements of the support medium are preferably metallized by physical vapor deposition of metal in a vacuum coating system. The physical vapor deposition of metal in a vacuum coating system is preferably carried out by thermal evaporation or by electron beam evaporation or by laser beam evaporation or by arc evaporation or by cathode sputtering or by ion-assisted deposition processes.

In the context of the invention, thermal vapor deposition is a process wherein a material is vaporized or atomized by inputting thermal energy and is then deposited on the support elements of the support medium. Advantageously, several, i.e. more than two, different vapor deposition angles can be used during the thermal vapor deposition process to sheathe the support elements with the first material as completely as possible, i.e. on all sides.

Any other deposition methods mentioned here are adequate, essentially differing in the type of energy input into the first material.

In an advantageous variant of the method, the support elements are sheathed with the first functional material by thermal spraying. This thermal spraying is preferably carried out by wire flame spraying or by powder flame spraying or by high-speed flame spraying or by high-speed wire flame spraying or by arc wire spraying or by plasma spraying or by cold gas spraying or by molten bath spraying.

When using thermal spraying, the support elements of the support medium are also completely sheathed on all sides with the first material at several different, i.e. more than two, spraying angles.

As an alternative to thermal vapor deposition or thermal spraying at several different, i.e. more than two, vapor deposition angles or spraying angles, thermal vapor deposition or thermal spraying for sheathing the support elements with the first functional material may be carried out by thermal vapor deposition or thermal spraying under one or two vapor deposition-or injection angles, which are preferably offset by 180°, accompanied by a subsequent heat treatment. In this heat treatment, heat is supplied to the first functional material, which had been applied to support elements of the support medium by thermal vapor deposition or by thermal spraying, in a defined short period of time or at defined time intervals in such a way that the deformability of the applied first functional material increases until it begins to flow and envelops the support elements. The heat input must take place in such a time interval that the first functional material sheathes the support element, but does not drip therefrom. This method can be used for expanding a cross-section of the first material applied to the support elements by up to 10 μm.

The heat input is preferably applied pulse-wise with a pulse duration in the range from 1 ms to 100 s, wherein the temperature of the heat source is higher than the melting temperature of the applied first functional material by up to 500 K. The effect of the heat input can therefore be considered as shock-heating.

If the first functional material is an electrically conductive material and the thickness of the functional material layer applied to the support elements is less than one micrometer, the heat can be introduced by means of microwaves. In this case, the electrically conductive first functional material applied to the support elements is exposed to microwave radiation, wherein the microwave energy is dimensioned such that the resulting heating changes the deformability of the first functional material, as already described, in such a way that the support elements are sheathed with the first functional material.

For a layer of the first functional material having a thickness not exceeding about 1 μm, the irradiation power for irradiation with a 2.45 GHz magnetron can be in the range between 1 $Ws/cm^2$ to 10,000 $Ws/cm^2$ with an exposure time between 0.1 s and 150 s. To optimize the heat input, the microwave irradiation power can also be supplied as pulse trains. The pulse widths range from 0.01 s to several seconds.

If the first functional material is a metal, the support elements of the support medium can be metallized by chemical metal coating in a two-stage process, wherein the metallization of the support elements of the support medium includes the following steps:
  seeding process and
  metal coating process.

Alternatively, the metallization of the support elements of the support medium can be carried out by electrochemical metal layer reinforcement in a three-stage process, wherein the metallization of the support elements of the support medium includes the following steps:
  seeding process,
  metal coating process and
  metal layer reinforcement process.

In a further possible variant, the support elements of the support medium can be metallized by dipping the support medium in a molten metal bath.

A preferred application of the foil-like functional material according to the invention relates to the formation of an electrode foil for use in electrical energy stores. Actually, the term electrode foil should here not be used in this context, because in the context of the invention the electrode material is foil-like. However, since the term electrode foil is common in practice both for foils and for foil-like materials, it will also be used here, but always with the proviso that in the application according to the invention is specifically a foil-like electrode material.

Conceptually, the electrode foil consists of a foil-like functional material with a support medium to be regarded as a matrix, whose support elements are sheathed with a first electrically conductive functional material, preferably a metal, such as aluminum, copper, silver, gold, brass or other metals or metallic alloys. In special cases, other electrically conductive functional materials, such as, for example, conductive polymers, can also be used to form the electrically conductive layer enveloping the support elements. This electrically conductive functional material layer, with which the support elements of the support medium are sheathed, operates to transport charge carriers, i.e. transport charge carriers into or out of the electrode foil, which is a non-active, but nevertheless important function for an electrode foil. Since quasi all support elements of the support medium are interconnected, carriers can flow in and out in the x-, y- and z-direction, thus enabling current flow for contacting the electrode foil. The support medium metallized in this way, which can be regarded as a metallized matrix, has a thickness of <100 μm. In particular, three-dimensional textile fabrics with a cross-sectional dimension of ≤100 μm are proposed as the support medium. To form the electrode foil, it is also necessary to introduce a second functional material performing at least one second function into the existing partial volumes in the support medium, which are spanned by the metallized support elements. The second function fulfilled by the second functional material is directed to energy or charge carrier storage, i.e. an active function characteristic of an electrode foil to be used in an electrical energy store.

The second functional material introduced into the partial volumes may also perform other functions in addition to the characteristic function mentioned above. This can be a non-active function, such as an electrical conduction function. The second functional material can also contribute to the mechanical stability of the electrode foil. Advantageously, the top and bottom sides of the electrode foil may be adherently coated with the second functional material.

The invention provides a foil-like functional material in which the ratio of the functional material, which fulfills the active function characteristic for use as an electrode foil in an electrical energy store, to the other materials contained in the foil-like functional material, i.e. the construction material and the first functional material, is large.

A support medium made of a construction material formed in the form of a two-dimensional textile surface element with a three-dimensional extent can in the context of the invention be regarded as a matrix which consists of textile materials, in particular in the form of yarns or threads, but also of metal in the form of metallic threads referred to as wires. Textile materials are all materials that are manufactured or processed using any textile technology. The yarns or threads in turn consist of individual elongated filaments, the monofilaments. In addition to natural fibers, glass fibers, carbon fibers, mineral wool fibers, polymer fibers or wires can also be used as a material of the yarns or threads. Wires inherently represent a monofilament. Filaments in the context of the invention also refer to fibers or wires. Yarns, threads and wires can then be processed to form a textile band, in particular a woven band in which individual warp threads and weft threads are interwoven. Such support media can be, for example, braided fabrics, woven fabrics, or knitted fabrics.

For the application of a braided fabric, woven fabric or knitted fabric according to the invention, the thread density should be as low as possible, i.e. just as low as the technological processing requirements permit for the support and stability function.

Sheathing the support elements of the support medium with the first functional material can lead to increased mechanical stability of the support medium, which can make it easier to execute of subsequent processing steps.

Advantageously, the processing of the support medium can be performed in a roll-to-roll process.

Foil-like functional materials can also be designed for other applications, in which case they are composites of other materials suitable for the corresponding application.

For example, they can be designed for use in catalysts or in heatable plastic mats with a micro-ventilation system, to list only two additional examples.

Further details, features and advantages of embodiments of the invention result from the following description of exemplary embodiments with reference to the appended drawings, which show in:

DETAILED DESCRIPTION OF THE INVENTION

Figure 1:
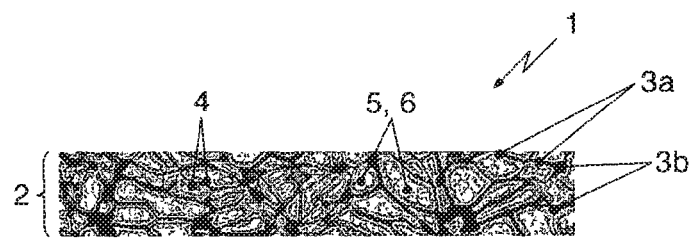
FIG. 1: a basic schematic diagram of a foil-like functional material in cross section.

FIG. 1 shows the basic structure of a foil-like functional material 1 in cross section. The foil-like functional material 1 has a support medium 2 consisting of a construction material and is formed as a matrix, the support elements 3 of which are designed as linear support elements 3a and as node-shaped support elements 3b and are sheathed with a first functional material 4 that fulfills a first function. Partial volumes 5 are spanned by the support elements 3a, 3b and filled with a second functional material 6, which performs at least one second function that differs from the first function. Depending on the application, the foil-like functional material 1 can also be referred to as foil-like electrode material 1 or as foil-like anode material 1 or as anode foil 1, or as foil-like cathode material 1 or as cathode foil 1, wherein the top and/or bottom side of the foil-like functional material 1 is then completely covered with the second functional material 6.

Figure 2A:
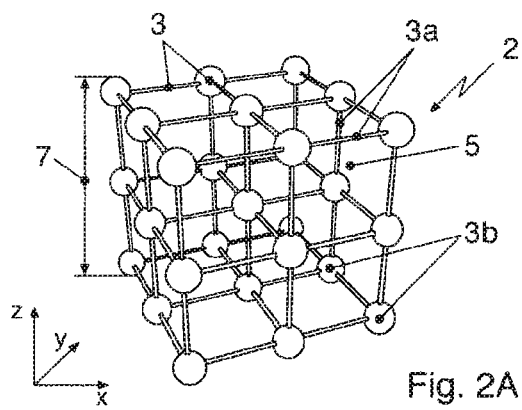
FIG. 2A: a schematic diagram of a simplest design of a matrix.

FIG. 2A shows schematically a simple basic embodiment of a support medium 2. Line-shaped support elements 3a and node-shaped support elements 3b are only located in mutually perpendicular planes. The support elements 3a and 3b span open partial volumes 5 which are interconnected and open on all sides. The support medium 2 is shaped foil-like, i.e. its x- and y-dimensions are much greater than its dimension in the z-direction, which is referred to as the cross-sectional extent 7 of the support medium 2. This condition always applies in the context of this invention, even if not always clearly illustrated in the figures. A support medium 2 is always constructed of two different types of support elements 3a and 3b, which include all structural elements contained in the support medium 2 and consist of the construction material. Linear support elements 3a are, for example, yarns in textiles or polymer threads in expanded polymers or linear structures, molecular fibers, spun fibers, textile fibers, filaments or other linear structures. Node-shaped support elements 3b are, for example, crossed threads of warp yarns and weft yarns in textile fabrics, intertwined filaments, a compact concentration of thread-like elements of the construction material, a point-shaped collection of elements of the construction material, for example in expanded polymers, three-dimensional fabric piles of the construction material and the like. The support elements 3 span interconnected partial volumes 5 which are open laterally and in particular toward the top and the bottom of the support medium 2. In the special case of the support medium 2 in FIG. 2A, the line-shaped support elements 3a and the node-shaped support elements 3b are always located in mutually perpendicular parallel planes.

Reference is made to a support medium 2 if the support medium 2 extends in three dimensions. Accordingly, reference is already made to a support medium 2 when all support elements 3 are practically in a single plane, which however no longer represents a two-dimensional area, but has a three-dimensional extent.

Figure 2B:
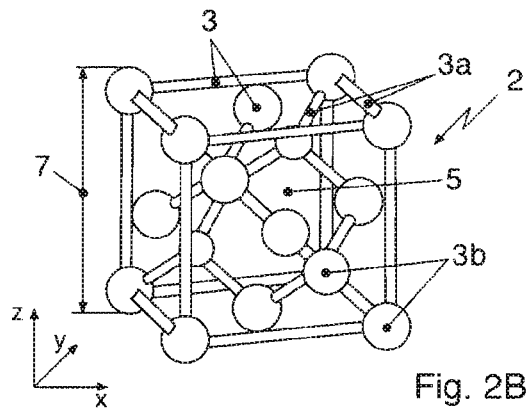
FIG. 2B: a schematic diagram of a matrix in a more disordered design than shown in FIG. 2A, FIG. 2C: a scanning electron micrograph of an expanded polytetrafluoroethylene foil—ePTFE—as an embodiment of a matrix as a support medium of a foil-like functional material.

FIG. 2B shows a schematic diagram of a more disordered arrangement of a support medium 2 compared to the support medium 2 from FIG. 2A, representing one of the more typical forms of a support medium 2 for a foil-like functional material. This schematic diagram is intended to show that a support medium 2 need not have an ordered structure. The distribution of the linear support elements 3a and the node-shaped support elements 3b can in fact be disordered. Also, in the case of FIG. 2B, the support elements 3a and 3b span interconnected open partial volumes 5 which are open on all sides.

Figure 2C:
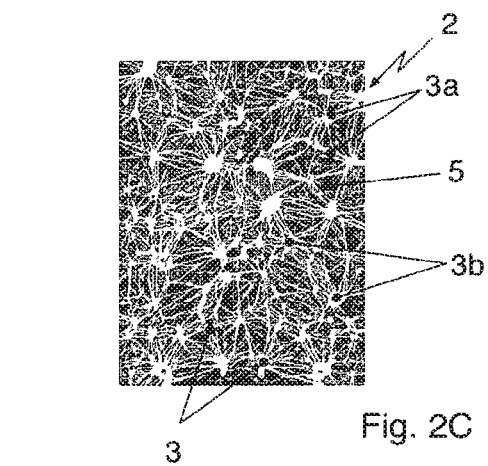
FIG. 2D: a schematic diagram of a single-layer fabric as an embodiment of a support medium of a foil-like functional material.
FIG. 2E: a schematic diagram of a single-layer knitted fabric as an embodiment of a support medium of a foil-like functional material.
FIG. 2F: a scanning electron micrograph of a textile braid as an embodiment of a support medium of a foil-like functional material.

FIG. 2C shows a scanning electron micrograph, hereinafter referred to as SEM, in a plan view of an expanded polytetrafluoroethylene foil, also referred to as ePTFE, as a support medium 2. Line-shaped support elements 3a and node-shaped support elements 3b are disordered. The line-shaped beam elements 3a are oriented molecular fibers, whereas the node-shaped support elements 3b represent point-shaped clusters of polytetrafluoroethylene material components. The oriented molecular fibers, i.e. the line-shaped support elements 3a and the node-shaped support elements 3b, span partial volumes 5. The partial volumes 5 are interconnected.

Figure 2D:
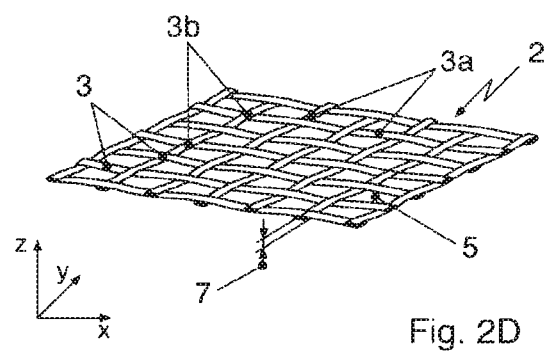

FIG. 2D shows schematically a support medium 2 in the form of a textile fabric. The linear support elements 3a are yarns, threads or wires, which are referred to as warp threads and weft threads. The node-shaped support elements 3b are those areas where warp threads and weft threads cross. The support medium 2 in the form of a textile fabric in FIG. 2D is an example of all the support elements 3 located essentially in a single plane, although the support medium 2 has a three-dimensional extent. Open partial volumes 5 are spanned between the linear support elements 3a, the warp threads and the weft threads and their crossing points, namely the node-shaped support elements 3b. The distance resulting from the crossing of warp thread and weft thread corresponds to the cross-sectional extent 7 of the support medium 2.

Figure 2E:
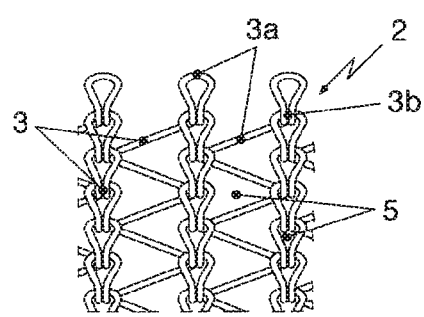

FIG. 2E shows a schematic diagram of a top view of a textile knitted fabric as support medium 2. Such foil-like textile structures can be industrially produced from thread systems by forming stitches on a knitting machine; they therefore are part of knitwear. In this case, the linear support elements 3a are textile threads, the node-shaped support elements 3b are formed by intertwined threads. Open partial volumes 5 are spanned between the linear support elements 3a formed by textile threads, and their intertwined portions of the textile threads, i.e. the node-shaped support elements 3b. The distance resulting from the intertwined superimposed portions of the textile threads corresponds to the cross-sectional dimension 7 of the support medium 2.

Figure 2F:
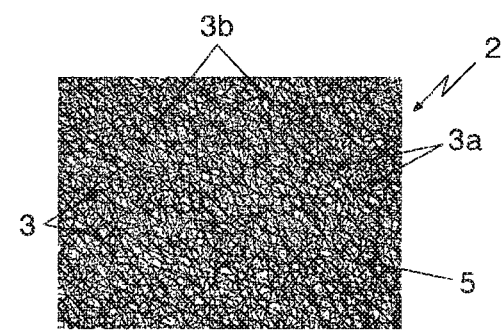

FIG. 2F depicts an SEM of a plan view of a mesh as a support medium 2. The linear support elements 3a are formed from textile threads, the node-shaped support elements 3b are formed from crossings or accumulations of textile threads. In this example, the distribution of the linear support elements 3a and the node-shaped support elements 3b is stochastic. Open partial volumes 5 are spanned between several intersecting textile threads, the node-shaped support elements 3b, and a relatively large number of textile threads, i.e. the linear support elements 3a.

Figure 3A:
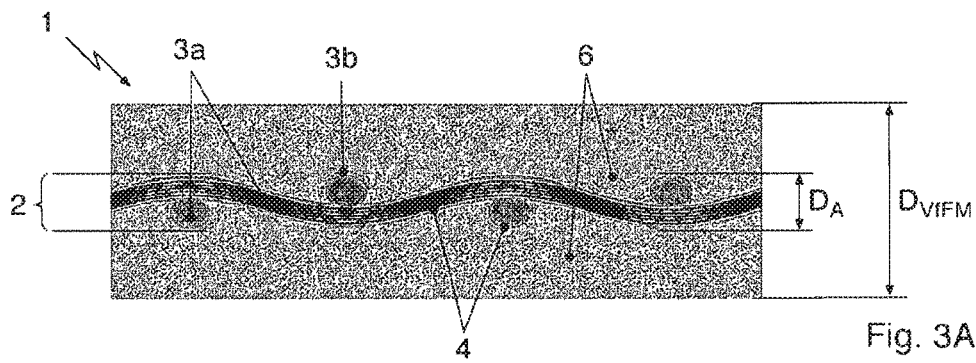
FIG. 3A: a basic schematic diagram of a foil-like functional material with a glass fabric in cross section.

FIG. 3A shows schematically a foil-like functional material 1, consisting of a textile support medium 2, in cross section. The linear support elements 3a, the textile warp threads and weft threads and their crossing areas, the node-shaped support elements 3b of the textile support medium 2, a textile fabric, are sheathed by a first functional material 4, which fulfills a first function. The partial volumes 5 are filled with a second functional material 6, which fulfills at least one second function that differs from the first function. The top side and bottom side of the support medium 2 are covered with the second functional material 6. The support medium 2 is a glass fabric, the basic structure of which is shown in FIG. 2D. A first functional material 4, which fulfills a first function, is applied both to the linear support elements 3a and to the node-shaped support elements 3b. The first functional material 4 envelops the linear and the node-shaped support elements 3a and 3b. $D_A$ denotes the cross-sectional extent 7 of the support medium 2, whose support elements 3 are sheathed with the first functional material 4.

$D_{vfFM}$ denotes the thickness of the foil-like functional material 1, the top and bottom sides of which are coated with the second functional material 6.

Figure 3B:
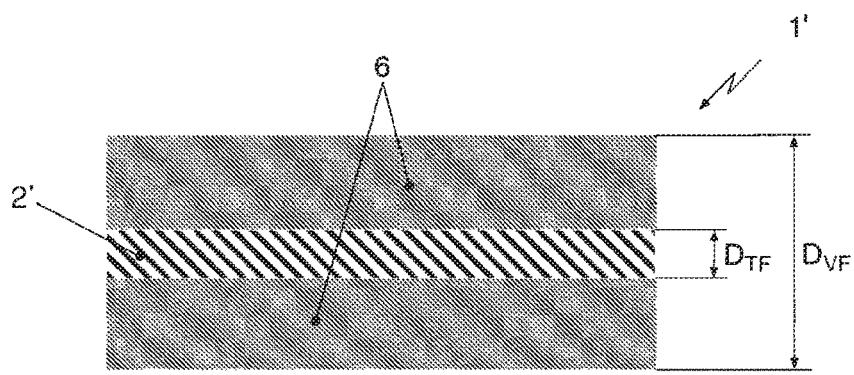
FIG. 3B: a basic schematic diagram of an electrode foil according to the prior art in cross section.

FIG. 3B shows as a comparison to the foil-like functional material 1 shown in FIG. 3A a cross section of a conventional electrode foil according to the prior art with a metal foil 2' or a metalized foil, preferably a metalized polymer foil, as the support medium 2'. The same functional material 6 with which the open partial volumes 5 the foil-like functional material 1 shown in FIG. 3A are filled with and with which the top and bottom sides have been adherently coated, is applied on both sides of the support medium 2'. $D_{TF}$ corresponds here to the thickness of the metal foil 2', which both acts as a support medium and has the function to charging and discharging the charge carriers. $D_{VF}$ corresponds to the thickness of the electrode foil. The thickness $D_{VF}$ of the electrode foil from FIG. 3B corresponds to the thickness $D_{VfFM}$ of the foil-like functional material 1 from FIG. 3A that was coated on both sides with the second functional material 6. $D_{vfFM}$ is hence equal to $D_{VF}$.

Figure 3C:
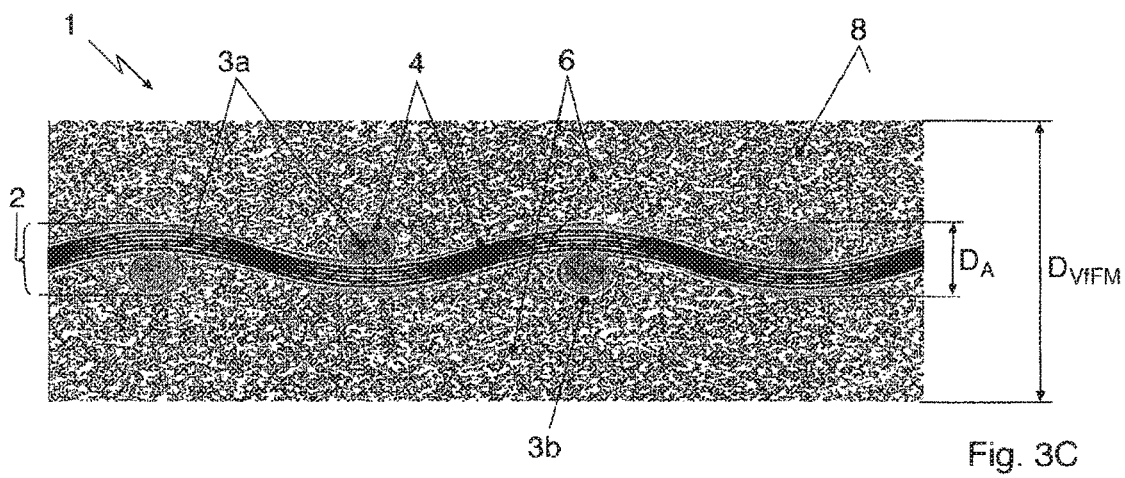
FIG. 3C: a more detailed schematic diagram of a foil-like functional material in cross section.

FIG. 3C shows in cross section a detailed schematic diagram of the foil-like functional material 1 shown in FIG. 3A. The second functional material 6 fulfills at least one active and at least one non-active function. The second functional material 6 has open pores 8 as its inner structure, which however do not correspond to the partial volumes 5.

In principle, the foil-like functional material 1 according to the invention is distinguished by a large volume or mass fraction of the second functional material 6 in relation to the total volume or the total mass of the foil-like functional material 1. This is of important for the use of the foil-like functional material 1, because a large proportion of the total volume or the total mass of the foil-like functional material 1 is thus taken up by the second functional material 6, which fulfills an active function.

Figure 4A:
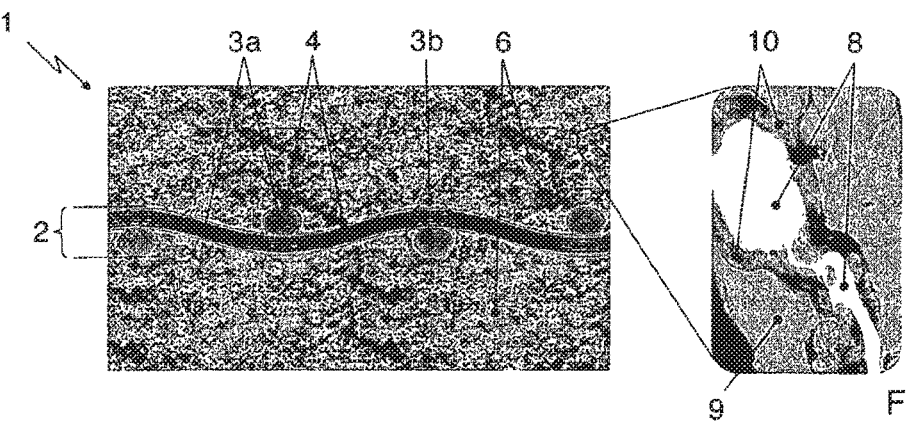
FIG. 4A: a schematic diagram of an anode foil of an aluminum electrolytic capacitor with a glass fabric as a support medium in cross section.

FIG. 4A shows an anode foil 1 for an aluminum-illustrated electrolytic capacitor in cross-section, i.e. a foil-like functional material 1 in an application as an electrode, wherein the support medium 2 is a glass fabric, as shown in FIG. 2D. The support elements 3 are sheathed with aluminum as the first functional material 4. Depending on the electrode type, the layer thickness can be in a range from 0.2 μm to 4 μm. Highly porous aluminum is introduced into the partial volumes 5 as the second functional material 6. The highly porous aluminum is also disposed on the top and bottom sides of the support medium 2. As seen in the enlarged detail shown on the right-hand side of FIG. 4A, the highly porous aluminum consists of a highly porous aluminum body 9 and of aluminum oxide layers 10 which have formed on the surfaces of the highly porous aluminum body 9, as well as open pores 8. Open pores 8 in the second functional material 6 are used to retain an electrolyte when the foil-like functional material 1 is used as an electrode of an electrical energy store. The aluminum oxide layer 10 representing the dielectric-layer of the aluminum electrolytic capacitor was generated on the surface of the highly porous aluminum body 9 by anodic oxidation. The highly porous aluminum body fulfills a non-active function, namely to charging and discharging charge carriers. The aluminum oxide layer 10 fulfills the active function of storing the charge carriers, i.e. charge carrier storage as a characteristic function of the application of the foil-like functional material 1 as the anode foil 1 for an aluminum-electrolytic capacitor. The open pores 8 are filled with an electrolyte and hence fulfill a non-active function by providing the volume for the electrolyte. The highly porous aluminum is preferably introduced into the partial volumes 5 and applied to the top and bottom sides of the support medium 2 by vacuum coating processes.

The quantity of aluminum, as the first functional material 4 sheathing the support elements 3, must be sized to meet the electrical wiring requirements, generally corresponding to an aluminum layer with a thickness between 0.2 μm and 4 μm. To ensure these requirements, for example, a glass fabric with twenty-two warp threads and weft threads per centimeter is used as the support medium 2. The fabric is flattened. The compression creates warp threads and weft threads with a width of 180 μm and a thread height of 15.5

µm. The first functional material 4 has been applied to these threads in the form of an aluminum layer, which has excellent electrical conduction properties. The support medium is thus metallized with the first functional material 4, i.e. aluminum, wherein the layer thickness of the aluminum applied to and sheathing the warp- and weft threads is on average about 2.5 µm. This results in a cross-sectional extent 7 of the metallized support medium 2 of 36 µm. Highly porous aluminum was deposited as the second functional material in the partial volumes 5 of the metallized support medium 2, i.e. in the mesh spaces of the glass fabric. Highly porous aluminum, each with a thickness of 32 µm, was also deposited on the top and bottom sides of the foil-like functional material 1. The total thickness of the anode foil 1 is 100 µm.

The support medium 2 metallized with aluminum as the first functional material 4 occupies a volume of 0.00156 $cm^3$ per square centimeter of the base area of the anode foil 1. The total volume of the anode foil 1 per square centimeter base area is 0.01 $cm^3$. The volume fraction of the support medium 2 and the first functional material is thus approximately 15.6%, the volume fraction of the second functional material 6, namely the highly porous aluminum, is approximately 84.4%.

Figure 4B:
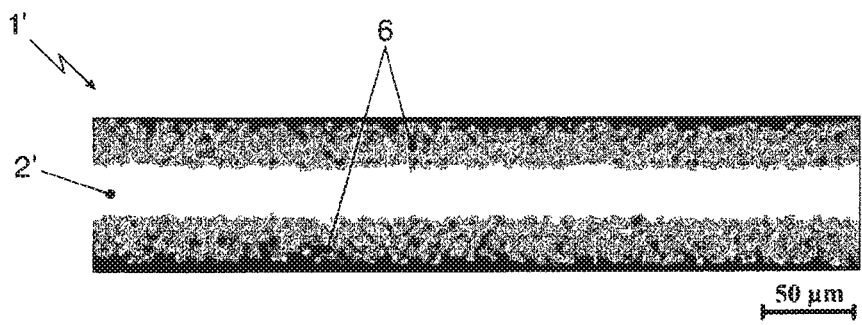
FIG. 4B: a scanning electron micrograph of an anode foil of aluminum-electrolytic capacitor as representative of a functional foil according to the prior art in cross section.

Conversely, in a conventional anode foil 1', the support medium 2' takes up a considerably larger proportion of the total volume of the anode foil 1'. A possible embodiment of such a conventional anode foil 1' according to the prior art is shown in cross section in FIG. 4B. This anode foil 1' has been prepared from a high-purity aluminum foil by electrochemical etching, with the interior part remaining unprocessed. This proportion represents the support medium 2' of the anode foil 1'. In a conventional anode foil 1' having a thickness of 100 µm, as shown in the SEM in FIG. 4B, the thickness of the support medium 2', which was not electrochemically etched, is about 28.6 µm and the electrochemically etched area is about 71.4 µm, which corresponds to a thickness of this area of about 35.7 µm per side. The anode foil 1' is created after a so-called forming process, i.e. an electrochemical or anodic oxidation. The support medium 2' performs the support function and is at the same time responsible for charging and discharging charge carriers. The electrochemically etched area performs the actual capacitor function, i.e. the storage of charge carriers. The ratio of the thickness $D_{TF}$ between the support medium 2' and the layer performing the actual capacitor function can be estimated to be approximately one to two and a half, i.e. 1 to 2.5.

The support medium 2' of the conventional anode foil 1' occupies a volume of 0.00286 $cm^3$ per square centimeter. This corresponds to approximately 28.6% of the total volume of the conventional anode foil 1' according to the prior art. The area of the conventional anode foil 1' performing the capacitor function occupies a volume of 0.0032 $cm^3$ per square centimeter of base area. This corresponds to approximately 71.4% of the total volume. In contrast, with the solution according to the invention, 84.4% of the total volume is available for performing the capacitor function, i.e. for storing charge carriers.

In the case of the anode foil 1 for an aluminum-electrolytic capacitor, the proportion of the volume of the second functional material 6 available for fulfilling the capacitor function can be further increased up to 94% by further reducing for example the number of warp threads and weft threads, or in place by using of threads having a diameter of 4 µm instead of threads having a diameter of 5 µm.

Figure 5A:
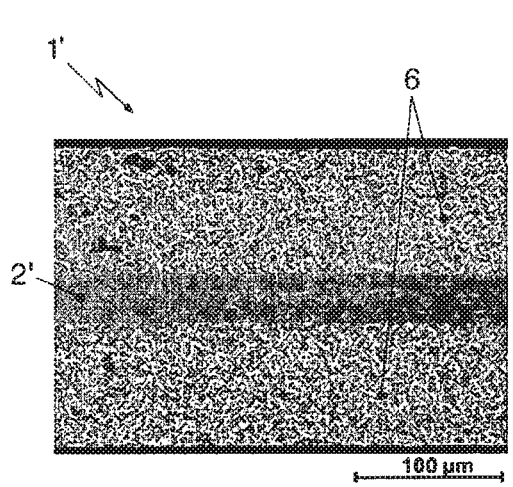
FIG. 5A: a scanning electron micrograph of a conventional electrode for lithium-ion-batteries according to the prior art in cross section FIG. 5B a schematic diagram of a foil-like electrode for lithium-ion-batteries with a textile support medium whose support elements are sheathed with aluminum, in cross-section, and FIG. 6 a schematic diagram of a foil-like graphite electrode for lithium-ion-batteries with a copper-plated steel wire mesh as the support medium in cross-section.

FIG. 5A shows an SEM of a cathode 1' of a lithium-ion-cell according to the prior art in cross section. The term cathode is always to be understood in the context of discharging the cell. The electrode is one of the so-called lithium-metal-oxide-electrodes. Such a conventional cathode 1' consists of an intrinsically, electrically poorly conductive active material such as, for example, lithium and nickel oxide, lithium and manganese oxide, lithium and cobalt oxide or lithium and iron phosphate, as well as a number of additives, that fulfills non-active functions as a functional material. Carbon black is an important additive for producing electrical conductivity. An aluminum foil is used here as the support medium 2'.

The anode of a lithium-ion battery, which is not shown here, is made of graphite and is therefore referred to as a graphite electrode. The support medium 2' for the cathode, which is also referred to as a current collector, is an aluminum foil 2' and a copper foil for the unillustrated anode. The support medium 2' in the application shown in FIG. 5A, is also an aluminum foil with a thickness of 30 µm. The use of such an aluminum foil is to be regarded as state of the art. Furthermore, solutions exist in the prior art, wherein the support medium 2' is an aluminum foil with a thickness of 15 µm. The aim is to use 10 µm thick aluminum foils as the support medium 2'. The total thickness of the cathode foil is approximately 194 µm.

Figure 5B:
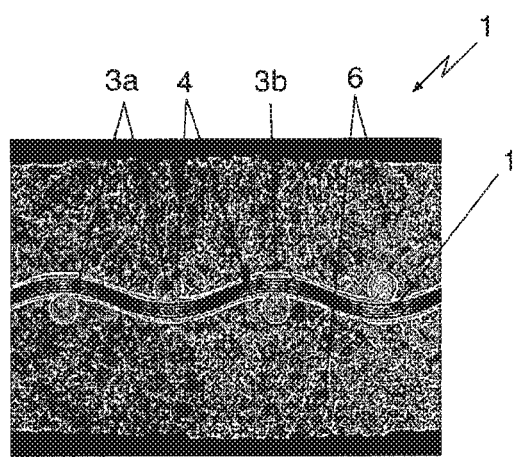

FIG. 5B shows schematically the application of a foil-like functional material 1 as a cathode 1 in a lithium-ion-cell in cross-section. The foil-like functional material 1 has a three-dimensional textile fabric as the support medium 2 in the form of a glass fabric, with 18 warp threads and 18 weft threads per centimeter. The warp and weft threads of the linear support elements 3a have an approximately round cross section with a diameter of approximately 35 µm. The areas where the warp threads and the weft threads intersect form the node-shaped support elements 3b. Aluminum is applied as a first functional material 4 to sheath the support elements 3a and 3b. The layer thickness of the applied aluminum is approximately 7 µm. The partial volumes 5 of the metallized support medium 2, i.e. the mesh spaces 5 between the warp threads and the weft threads, are filled with the second functional material 6. Top- and bottom sides of the foil-like functional material 1 are each coated with the second functional material 6 having a thickness of 55 µm. The second functional material 6 consists of a mixture of lithium-iron phosphate, conductive carbon black, solvents, binders and additives. The novel cathode 1 was calendared. Calendering refers to a process where the foil-like functional material 1 is passed sequentially through the gaps between a plurality of superimposed heated and polished rollers, which causes compression and solidification of the foil-like functional material 1, i.e. the cathode 1. The thickness $D_{VfFM}$ of the cathodes 1 after these processes is 194 µm, allowing an easy comparison with the prior art solution shown in FIG. 5A.

The support medium 2' in the form of an aluminum foil of the cathode 1' according to the prior art shown in FIG. 5A has a volume of 0.003 $cm^3$ per square centimeter. This corresponds to approximately 15.5% of the total volume of the cathode 1'. The second functional material 6 applied to both sides of the support medium 2' takes up a volume of 0.0164 $cm^3$ per square centimeter of base area. This corresponds to approximately 84.5% of the total volume.

When using a 15 µm thick aluminum foil as a support medium 2', the volume of the second functional material 6 would be approximately 0.018 $cm^3$. This would correspond to approximately 92.3% of the total volume of the cathode 1'. When using a 10 μm thick aluminum foil as the support medium 2', the volume of the second functional material 6 would be approximately 0.0184 cm³. This would correspond to approximately 94.85% of the total volume of the cathode 1'.

With the solution of a cathode 1 shown in FIG. 5B using a foil-like functional material, the volume of the support medium 2, the support elements 3 of which are sheathed with the first functional material 4, takes up approximately 4.7% of the total volume of the cathode 1. Thus, the proportion of the volume of the second functional material 6 is approximately 95.3% of the total volume of the cathode 1. In comparison, with a solution from the prior art shown in FIG. 5A, even when using a 10 μm thick aluminum foil as the support medium 2', which has thus far not been technically feasible, only a proportion of the second functional material 6 of the total volume of the cathode 1' of at most 94.85% is possible.

Figure 6:
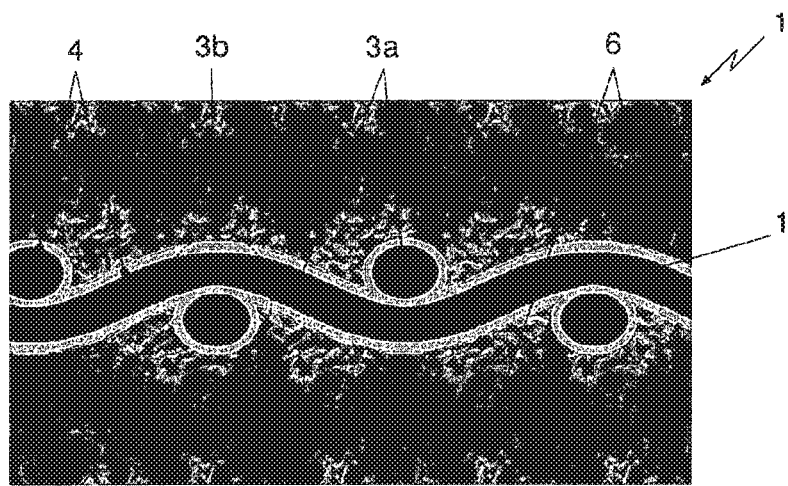

FIG. 6 shows schematically in cross-section an anode 1 of a lithium-ion-cell using a foil-like functional material. The anode 1 has a steel wire mesh as the support medium 2, with twenty warp wires and twenty weft wires per centimeter. Warp and weft threads are therefore monofilaments and have a diameter of about 15 μm. A compact copper layer with a thickness of approximately 4 μm is applied on and sheathes the support elements 3 (wires as linear support elements 3a and their crossing points as node-shaped support elements 3b) as the first functional material 4. The partial volumes 5 spanned by the support elements 3 are filled with the second functional material 6. The top and bottom sides of the foil-like functional material 1 are each coated with the second functional material 6 with a thickness of 75 μm. The second functional material is graphite with open pores. The anode 1 was calendared, as is also customary in the prior art. The thickness $D_{VFM}$ of the anode 1 is 188 μm after calendaring.

An anode for a lithium-ion-accumulator according to the prior art comparable to the anode 1 shown in FIG. 6 consists of graphite adherently applied to a copper foil. When using a 15 μm thick copper foil, this foil takes up a volume of 0.0015 cm³ per square centimeter of anode base. This corresponds to approximately 8.0% of the total volume of the anode. The graphite, i.e. the second functional material 6, adherently applied to the copper foil, occupies a volume of 0.0173 cm³ per square centimeter of anode base area. This corresponds to approximately 92.0% of the total volume of the anode. When using a 6 μm thick copper foil, this foil takes up a volume of 0.0006 cm³ per square centimeter of anode base area. This corresponds to approximately 3.2% of the total volume of the anode. The graphite, i.e. the second functional material 6, adherently applied to the copper foil, occupies a volume of 0.0182 cm³ per square centimeter of anode base area. This corresponds to approximately 96.8% of the total volume of the anode.

In comparison, with the solution shown in FIG. 6, the support medium 2, whose support elements 3 are sheathed with a compact copper layer having a thickness of approximately 4 μm, occupies a volume of approximately 0.0002 cm³ per square centimeter of anode base, which accounts for about 1.1% of the total volume of the anode. The second functional material 6, i.e. the graphite, takes up a volume of approximately 0.0186 cm³ per square centimeter of anode base area. The proportion of the second functional material 6 in the total volume of the anode 1 is thus 98.9%.

A cathode 1 or an anode 1 according to the invention can be produced using a foil-like functional material as follows:

A textile fabric is used as the support medium 2. The support elements 3, i.e. the warp and weft threads as line-shaped support elements 3a and the intersection area of warp and weft threads as node-shaped support elements 3b, are adherently sheathed commensurate with the application with an electrically conductive metal, for example aluminum or copper, as the first functional material 4. The layer thickness is between 1 μm and 4 μm. According to the concept of the invention, the support medium 2 renders the mechanical stability of the foil-like functional material 1 while the first functional material 4 fulfills the non-active function of charging and discharging the charge carriers. Nevertheless, the first functional material 4 can also contribute to increasing the mechanical stability of the foil-like functional material 1. The coating of the support elements 3 with the first functional material 4 can be performed using vacuum PVD-processes or thermal spray processes, with a thermal post-treatment, as already described, optionally carried out depending on the implementation of the method, by using the afore-described chemical and electrochemical methods or by hot-dipping the support medium in a molten metal bath, in which case the melting temperature of the metal must be below the temperature which would lead to the destruction of the textile fabric. Subsequently, the partial volumes 5 spanned by the support elements 3 sheathed with the first functional material 4 are filled with the second functional material 6. This produces a foil-like functional material 1, which is subsequently processed into a cathode 1 or anode 1 using methods known from the prior art.

To produce a cathode 1 or anode 1, the top and bottom sides of the foil-like functional material 1 are coated with the second functional material 6. The second functional material 6 is, for example, a coating compound known from the prior art, referred to as slurry. The second functional material fulfills as an active function storing charge carriers and as a non-active function charging and discharging of charge carriers to/from the storage locations in the second functional material 6. It can also contribute to mechanical stabilization. The coating compounds are stored in a reservoir where the constituents can also be mixed, and is applied on both sides of the foil-like functional material 1 by an application system, i.e. an applicator.

The processes following the coating, such as drying, can take place in accordance with the prior art.

A textile fabric suitable as a support medium 2 for a foil-like functional material 1 according to the invention should not necessarily be distinguished by a high density of warp and weft threads, but sufficiently large partial volumes 5 should be spanned by the warp- and weft threads as linear support elements 3a as well as by their crossover points as node-shaped support elements 3b, however under the proviso that the mechanical stability of the textile fabric is sufficiently high for the support function.

This means that a textile fabric suitable as a support medium 2 need not necessarily have to be characterized by a particularly small cross-sectional dimension 7 or a particularly small mesh size.

However, in many cases, it is useful to keep the diameter of the filaments, of which yarns for warp threads and weft threads for a support medium 2 are composed, as small as possible in order to keep the volume fraction of the support medium 2 with respect to the total volume of the foil-like functional material 1 sufficiently small, however with the proviso that the mechanical stability of the textile fabric is sufficiently high for the support function.

An anode foil for an aluminum-electrolytic capacitor will now be described below: The anode foil has a thickness of 100 μm. The support medium 2 is a glass fabric (EC5 5.5 1×0 5 5.5 1×0). This glass fabric has a thread density of 22 warp threads and 22 weft threads per cm. The warp threads and weft threads each consist of filaments with a diameter of 5 μm, wherein the thread width is 160 μm and the thread height is 17.5 μm. A 2.5 μm thick aluminum layer is applied to the warp threads and weft threads as the first functional material 4. The metallized glass fabric is characterized by the following dimensions:

- The cross-sectional extent 7 of the metallized fabric is 0.004 cm, i.e. 40 μm.
- The meshes of the metallized glass fabric have a size of approximately 0.031 cm×0.031 cm.
- The metallized glass fabric has a volume of approximately 0.004 cm$^3$ per cm$^2$ of the glass fabric base area.
- About 38.36% of the volume of the foil-like functional material 1 is taken up by the metallized glass fabric, the sum of the open, interconnected partial volumes 5 spanned by the linear and node-shaped support elements comprises 61.64% of this volume of the foil-like functional material 1.

The partial volumes 5 are filled with highly porous aluminum as the second functional material 6. A foil-like functional material 1 is formed. To form the anode foil, the top and bottom sides of the foil-like functional material 1 are also coated with highly porous aluminum. The anode foil 1 produced in this way is characterized by the following dimensions:

- The sum of the volume of the highly porous aluminum, i.e. the second functional material, applied to the top and bottom sides of the foil-like functional material is 0.006 cm$^3$ per square centimeter of anode foil base area.
- The total volume of the highly porous aluminum, i.e. the second functional material which fulfills the function of storing charge carriers characteristic of an electrolytic capacitor, is 0.0085 cm$^3$ per square centimeter of anode foil base area.
- The highly porous aluminum takes up 85% of the total volume of the anode foil.

In another anode foil for an aluminum-electrolytic capacitor, a glass fabric having warp and weft threads is used is used as a support medium 2. The glass fabric consists of approximately 102 filaments with a diameter of 5 μm and with a thread density between 15 to 20 threads per cm. A significant reduction in the cross-sectional dimension 7 is achieved by compressing the thread cross-section and smoothing the thread curvature with biaxial tension. The reduced cross-sectional dimension 7 can be between 25 μm to 35 μm, with the meshes being within a range from 325 μm to 550 μm×325 μm to 550 μm. With this anode foil, the proportion of the volume of the foil-like functional material 1 occupied by the metallized glass fabric, i.e. the metallized support medium 2, can be reduced to 13.5%.

In another anode foil for an aluminum-electrolytic capacitor, a glass fabric having warp and weft threads is used is used as a support medium 2. The glass fabric consists of approximately 51 filaments with a diameter of 4 μm and the thread density between 20 to 25 threads per cm. A significant reduction in the cross-sectional dimension 7 is achieved by compressing the thread cross-section and smoothing the thread curvature with biaxial tension. The reduced cross-sectional dimension 7 can be between 10 μm and 18 μm, with the meshes being within a range of 300 μm to 425 μm×300 μm to 425 μm. With this anode foil, the proportion of the volume of the foil-like functional material 1 occupied by the metallized glass fabric, i.e. the metallized support medium 2, can be reduced to 5.5%.

A positive or negative electrode for lithium-ion batteries will now be described below: A textile fabric with a warp and weft consisting of approximately 102 filaments having a diameter of 5 μm and a thread density is between 12 to 18 threads per cm was used as a support medium 2. The cross-sectional extent 7 of the support medium 2 can be up to 100 μm. The size of the meshes can be within the range of 400 μm to 725 μm×400 μm to 725 μm. The support elements 3 of the support medium 2, i.e. warp and weft as line-shaped support elements 3a and a crossing area of warp and weft as node-shaped support elements 3b, are adherently sheathed with an electrically conductive metal, aluminum or copper, as the first functional material 4 commensurate with the intended use, for example as positive or negative electrode. The proportion of the volume occupied by the metallized support elements 3 is approximately 6% of the total volume spanned by the support medium 2.

With yarns consisting of 51 filaments with a diameter of 4 μm and having an almost round cross-section, support media 2 can be produced from textile fabrics and have a thread density of between 17 and 22 threads per centimeter, which have a cross-sectional extent 7 of up to 65 μm. The size of the meshes is within the range of 425 μm to 600 μm×425 μm to 600 μm. The proportion of the volume taken up by the metallized support elements 3 is then approximately 3% of the total volume spanned by the support medium 2.

LIST OF REFERENCE SYMBOL

1 foil-like functional material, foil-like anode material or anode foil, foil-like cathode material or cathode foil
1' conventional electrode foil according to the prior art, anode or cathode according to the prior art, foil-like functional material according to the prior art, anode foil for electrolytic capacitors according to the prior art,
2 support medium
2' support medium according to the prior art; metal support foil, metallized polymer foil, aluminum foil according to the prior art
3 support element
3a linear support element
3b node-shaped support element
4 first functional material
5 partial volumes, mesh space of a fabric
6 second functional material
7 cross-sectional extent of the support medium 2
8 open pores
9 aluminum body
10 aluminum oxide layers
$D_A$ cross-sectional extent of the support medium 2
$D_{vfFM}$ thickness of the coated foil-like functional material 1
$D_{TF}$ thickness of the support foil 2'
$D_{VF}$ thickness of the electrode foil

The invention claimed is:

1. A material in sheet or web form, the material comprising: a support medium made of at least one construction material and having a three-dimensional total support volume having an x-dimension representing a length, a y-dimension representing a width, and a z-dimension representing a thickness≤100 μm; the support medium is a matrix of support elements including a plurality of linear support elements and a plurality of node-shaped support elements which form material components of the support medium and penetrate the total support volume; each of the plurality of linear support elements having three spatial dimensions including: a first dimension, a second dimension, and a third dimension; each of the second and the third dimensions being smaller than the first dimension; with a ratio of the first dimension to each of the second and the third dimensions being at least 50:1 and a ratio of the second and the third dimensions to one another being not less than 1:5 and not greater than 5:1; the total support volume being smaller in the z-dimension in comparison to that in the x- and the y-dimensions with the total support volume having interconnected cavities defined by the support elements neighboring one another; wherein the plurality of linear support elements have at least in sections distances from one another which are greater than 5:1 in relation to the larger of the second and the third dimensions; wherein the plurality of linear support elements and the plurality of node-shaped support elements are sheathed with a first functional material fulfilling a first function, and wherein a portion of the total support volume formed by the interconnected cavities is filled with at least one second functional material, which fulfills a second function that differs from the first function; wherein the support medium is a glass-fiber fabric tape, a carbon-fiber fabric tape, a mineral-wool-fiber fabric tape, a polymer-fiber fabric tape or a wire fabric tape; wherein the first functional material is a metal; and wherein the at least one second functional material is one of: (i) a substance mixture of lithium/nickel oxide, lithium/manganese oxide, lithium/cobalt oxide, or lithium/iron phosphate; or (ii) graphite.

2. The material according to claim 1, wherein the at least one second functional material covers a top side of the support medium, a bottom side of the support medium, or both the top and bottom sides of the support medium.

3. The material according to claim 1, wherein the plurality of linear support elements of the support medium are interwoven mutually perpendicular warp threads and weft threads forming a fabric.

4. A method for producing a material in sheet or web form, the material comprising: a support medium made of at least one construction material and having a three-dimensional total support volume including an x-dimension representing a length, a y-dimension representing a width, and a z-dimension representing a thickness≤100 μm; the support medium is a matrix of support elements including a plurality of linear support elements and a plurality of node-shaped support elements which form material components of the support medium and penetrate the total support volume; each of the plurality of linear support elements having three spatial dimensions including: a first dimension, a second dimension, and a third dimension; each of the second and the third dimensions being smaller than the first dimension; with a ratio of the first dimension to each of the second and the third dimensions being at least 50:1 and a ratio of the second and the third dimensions to one another being not less than 1:5 and not greater than 5:1; the total support volume being smaller in the z-dimension in comparison to that in each of the x- and y-dimensions with the total support volume having interconnected cavities defined by the support elements neighboring one another; wherein the plurality of linear support elements have at least in sections distances from one another which are greater than 5:1 in relation to the larger of the second and the third dimensions; wherein the plurality of linear support elements and the plurality of node-shaped support elements are sheathed with a first functional material fulfilling a first function, and wherein a portion of the total support volume formed by the interconnected cavities is filled with at least one second functional material, which fulfills a second function that differs from the first function; wherein the support medium is a glass-fiber fabric tape, a carbon-fiber fabric tape, a mineral-wool-fiber fabric tape, a polymer-fiber fabric tape or a wire fabric tape; wherein the first functional material is a metal; and wherein the at least one second functional material is one of: (i) a substance mixture of lithium/nickel oxide, lithium/manganese oxide, lithium/cobalt oxide, or lithium/iron phosphate; or (ii) graphite; the method comprising:
sheathing the support elements of the support medium by applying to the support elements the first functional material which fulfills the first function, and
filling the portion of the total support volume formed by the interconnected cavities with the at least one second functional material which fulfills the second function that differs from the first function.

5. The method according to claim 4, wherein the sheathing of the support elements is carried out by metallizing the support elements.

6. The method according to claim 5, wherein the metallization of the support elements is performed by physical vapor deposition of metal in a vacuum coating system or by thermal spraying or by hot dipping the support medium in a molten metal bath.

7. The method according to claim 5, wherein the metallization of the support elements is performed by chemical metal coating in a two-stage process, with the metallization of the support elements comprising the steps of:
seeding process, and
metal coating process.

8. The method according to claim 5, wherein the metallization of the support elements is performed by chemical metal coating in a three-stage process, with the metallization of the support elements comprising the steps of:
seeding process,
metal coating process, and
metal layer reinforcement process.

9. A material in sheet or web form, the material comprising: a support medium made of at least one construction material and having a three-dimensional total support volume including an x-dimension representing a length, a y-dimension representing a width, and a z-dimension representing a thickness≤100 μm; the support medium is a matrix of support elements including a plurality of linear support elements and a plurality of node-shaped support elements which form material components of the support medium and penetrate the total support volume; the total support volume being smaller in the z-dimension in comparison to that in the x- and y-dimensions with the total support volume having interconnected cavities defined by the support elements neighboring one another; each of the plurality of linear support elements having three spatial dimensions including: a first dimension, a second dimension, and a third dimension; each of the second and the third dimensions being smaller than the first dimension; wherein the plurality of linear support elements have at least in sections distances from one another which are greater than 5:1 in relation to the larger of the second and the third dimensions; wherein the plurality of linear support elements and the plurality of node-shaped support elements are sheathed with a first functional material fulfilling a first function, and wherein a remaining volume of the total support volume formed by the interconnected partial volumes is filled with at least one second functional material, which fulfills a second function that differs from the first function.

10. The material according to claim 1, wherein the at least one second functional material includes a further additive of: carbon black, a solvent or a binder.

11. The method according to claim 4, wherein the at least one second functional material includes a further additive of: carbon black, a solvent or a binder.

12. The material according to claim 9, wherein the at least one second functional material includes a further additive of: carbon black, a solvent or a binder.

13. The method according to claim 4, further comprising the step of covering with the at least one second functional material a top side of the support medium, a bottom side of the support medium, or both the top and bottom sides of the support medium.

14. The material according to claim 9, wherein the at least one second functional material covers a top side of the support medium, a bottom side of the support medium, or both the top and bottom sides of the support medium.

15. The material according to claim 1, wherein a distribution of the plurality of linear support elements and the plurality of node-shape support elements are disordered; and wherein the interconnected open partial volumes are open on all sides.

16. The method according to claim 4, wherein a distribution of the plurality of linear support elements and the plurality of node-shape support elements are disordered; and wherein the interconnected open cavities are open on all sides between adjacent linear support elements.

17. The material according to claim 9, wherein a distribution of the plurality of linear support elements and the plurality of node-shape support elements are disordered; and wherein the interconnected open cavities are open on all sides between adjacent linear support elements.

18. A composite material comprising:
a support medium in the form of a glass-fiber fabric tape, a carbon-fiber fabric tape, a mineral-wool-fiber fabric tape, a polymer-fiber fabric tape or a wire fabric tape, the support medium having a thickness $\leq 100$ μm, including interwoven warp threads and weft threads, and defining a support volume with interstitial spaces;
a first functional material, wherein the first functional material is a metal and forms a sheath around the warp threads and the weft threads to partially fill the interstitial spaces of the support volume while leaving a portion of the interstitial spaces of the support volume un-filled; and
a second functional material,
wherein the second functional material is one of:
(i) a mixture of lithium/nickel oxide, lithium/manganese oxide, lithium/cobalt oxide, or lithium/iron phosphate; or
(ii) graphite, and
wherein the second functional material fills the portion of the interstitial spaces of the support volume un-filled by the first functional material, and wherein a volume percentage of the second functional material is at least approximately 84%.

* * * * *